US010140197B2

(12) United States Patent
Goyet

(10) Patent No.: US 10,140,197 B2
(45) Date of Patent: Nov. 27, 2018

(54) METHOD PERFORMED BY AN ELECTRONIC DEVICE CAPABLE OF COMMUNICATING WITH A READER WITH IMPROVED SELF-TESTING

(71) Applicant: OBERTHUR TECHNOLOGIES OF AMERICA CORP., Wilmington, DE (US)

(72) Inventor: Christophe Goyet, Oak Hill, VA (US)

(73) Assignee: OBERTHUR TECHNOLOGIES OF AMERICA CORP, Wilmington, DE (US)

( * ) Notice: Subject to any disclaimer, the term of this patent is extended or adjusted under 35 U.S.C. 154(b) by 0 days.

(21) Appl. No.: 14/921,683

(22) Filed: Oct. 23, 2015

(65) Prior Publication Data
US 2017/0116101 A1    Apr. 27, 2017

(51) Int. Cl.
G06F 11/00 (2006.01)
G06F 11/263 (2006.01)
G06F 11/22 (2006.01)
G06K 7/10 (2006.01)

(52) U.S. Cl.
CPC ............ *G06F 11/263* (2013.01); *G06F 11/00* (2013.01); *G06F 11/2205* (2013.01); *G06F 11/2284* (2013.01); *G06K 7/10722* (2013.01)

(58) Field of Classification Search
CPC ............... G06F 11/263; G06F 11/2205; G06F 11/2284; G06F 11/2273; G06F 11/2289; G06F 11/27
USPC ......................................... 714/33, 25, 30, 36
See application file for complete search history.

(56) References Cited

U.S. PATENT DOCUMENTS

| | | | | |
|---|---|---|---|---|
| 9,237,465 | B1 * | 1/2016 | Tanner | H04B 5/0031 |
| 2004/0059925 | A1 * | 3/2004 | Benhammou | G06F 12/1458 |
| | | | | 713/189 |
| 2004/0098429 | A1 * | 5/2004 | Crispin | G06F 7/58 |
| | | | | 708/250 |
| 2005/0184163 | A1 * | 8/2005 | de Jong | G06Q 20/341 |
| | | | | 235/492 |
| 2006/0041402 | A1 * | 2/2006 | Baker | G06K 5/00 |
| | | | | 702/189 |
| 2008/0128515 | A1 * | 6/2008 | Di Iorio | G06Q 20/341 |
| | | | | 235/492 |
| 2013/0305228 | A1 * | 11/2013 | Black | G06F 11/3688 |
| | | | | 717/131 |

* cited by examiner

*Primary Examiner* — Joseph D Manoskey
(74) *Attorney, Agent, or Firm* — MH2 Technology Law Group, LLP

(57) ABSTRACT

Disclosed are methods and electronic devices that communicate with a reader. The methods and devices may receive a command emitted by the reader, and then select an application to be executed by the device based on the command that is received. The methods and devices may also determine whether to perform one or more self test according to which application was selected.

18 Claims, 3 Drawing Sheets

METHOD PERFORMED BY AN ELECTRONIC DEVICE CAPABLE OF COMMUNICATING WITH A READER WITH IMPROVED SELF-TESTING

BACKGROUND OF THE INVENTION

The invention relates to the field of electronic devices which can communicate with a reader, and more precisely to the field of devices communicating with readers.

The invention is more precisely directed to devices equipped with single-chip microcontrollers which can be smart-cards, embedded secure elements, USB tokens, micro secure digital cards, smart phones, smart watches, or any smart token.

Taking smart cards as an example, smart cards usually comprise a processor which, when the card is electrically powered, executes various applications through a platform acting as operating system. Smart cards are powered by the readers either using electrical contacts arranged on the cards (contact mode) or using near field communication technology (contactless mode).

Traditionally, when a smart card receives electrical power, several tests are executed. These tests are known to the skilled person as "power-up self-tests". For example, power-up self-test may include the testing of cryptographic functions. Cryptographic functions are generally implemented in a cryptographic module of a smart card, and the testing is carried out directly by the smart card (i.e. without receiving any command from the reader).

If these cryptographic functions behave abnormally, it can be deduced that the smart card is being attacked or that the smart card is damaged or at least that the cryptographic module of the smart card performing these functions is damaged.

The North-American standard FIPS 140 ("Federal Information Processing Standards") defines a plurality of such power-up self-tests. The power-up self-tests required in the FIPS 140 standard can require up to 500 milliseconds of execution time.

This duration is too long when a smart card is used in an environment where, for example, several users will use their card one after the other. This may be the case in a public transportation system (bus or metro) wherein at peak time, in order to avoid any congestion, the total time required to carry out the processing of a user (or transaction time) should not exceed 200 milliseconds.

Another example requiring a short transaction time is the use of smart cards for identifying users entering a building (usually known under the acronym PACS: Physical Access Control System). When used in a corporate environment, a smart card requiring more than 500 milliseconds of power-up self-tests leads to a long line of employees outside of a building which leads to a loss in productivity for the employer.

The duration of power-up self-tests is unacceptable.

The invention notably aims at overcoming this drawback.

OBJECT AND SUMMARY OF THE INVENTION

The present invention meets this need by providing a method performed by an electronic device capable of communicating with a reader, the method comprising:
  receiving a command emitted by the reader,
  selecting an application to be executed by the electronic device on the basis of said command, and
  determining whether to perform at least one self-test according to which application has been selected.

This method can be followed by the execution of one or more self-tests if it has been determined that they should be performed according to which application has been selected.

In the solutions of the prior art, an electronic device communicating with a reader carries out self-tests before an application is selected, and more precisely as soon as the electronic device is powered-up. Hence, prior art solution cannot take the type of application into account when performing the tests. This leads to an excessively long duration taken by the various self-tests of the electronic device even if the application requires a short transaction time or even if the application which will be selected will not use all the cryptographic functions.

The inventors of the present application have observed that in order to maintain an acceptable level of security, it is possible to determine, after the selection of the application, if all the self-tests available in an electronic device should be performed or if only a portion of these tests should be performed or if no self-test is required.

Therefore, the list of self-tests which are automatically performed as soon as the electronic device is powered-up can be reduced with respect to an electronic device of the prior art because the entirety of self-tests will only be performed if it is required by the selected application.

Hence, if the application requires only a limited number of cryptographic functions, the time required to perform an entire transaction is reduced because the application will determine that it is not necessary to perform one or several self-tests.

It should be noted that said command emitted by the reader can be a first Application Protocol Data Unit (APDU) message received by the device during a transaction, for example a command for selecting an application in the device.

Alternatively, said command can be the powering of the device.

It should also be noted that preferably, the device communicates temporarily or intermittently with the reader.

According to an embodiment, the application having been selected determines whether to perform said at least one self-test.

According to an embodiment, said at least one self-test is a self-test of a cryptographic function of the electronic device carried out by the electronic device.

By carried out by the electronic device, it should be understood that the electronic device performs the self-test by itself without receiving an instruction to perform the test from the reader or any communication from the reader.

According to an embodiment, said at least one self-test is a power-up self-test as defined in the FIPS 140 standard.

This embodiment allows performing a self-test from the FIPS 140 standard only if the application requires that this test be performed. This differs from the devices of the prior art in that this self-test from the FIPS 140 standard may not always be performed and therefore the total transaction time can be reduced.

According to an embodiment, said selection of an application comprises selecting an application among a list of applications of the electronic device, each application being associated with a list of self-tests specific to the application, and determining whether to perform at least one self-test comprises selecting at least one self-test to be performed or none in the list of self-tests associated with the application having been selected.

According to an embodiment, determining whether to perform at least one self-test is performed according to whether the electronic device communicates with the reader in contact mode or contactless mode.

Contactless mode is preferably used for less secured applications, which should be performed quickly. The application can therefore select fewer self-tests to be performed if the electronic device communicates with the reader in a contactless mode.

According to an embodiment, determining whether to perform at least one self-test is performed according to at least one indicator memorized in the electronic device.

By memorized in the device, it should be understood that the indicator has been memorized in a memory component of the electronic device prior to the electronic device receiving a command emitted by the reader.

This allows the application to determine according to an additional criteria is a self-test should be performed and to not be limited to a predetermined and rigid set of self-tests associated with the application.

According to an embodiment, determining whether to perform at least one self-test is performed according to a plurality of indicators memorized in the electronic device, each indicator corresponding to at least one self-test.

Each self-test may correspond to an indicator, or groups of self-tests may correspond to an indicator.

According to an embodiment, each indicator indicates whether the at least one self-test corresponding to the indicator is optional (i.e. the indicator is a flag), and if the indicator memorized in the device indicates that said at least one self-test corresponding to the indicator is not optional (i.e. if the indicator previously memorized in the device before the beginning of the transaction or before the electronic device receiving a command emitted by the reader), then after performing said at least one self-test corresponding to the indicator, the indicator is attributed a state which indicates that said at least one self-test corresponding to the indicator is optional.

This embodiment allows to track which self-tests have been performed in order to make these tests optional in a subsequent transaction.

By way of example, in an electronic device having two applications:

application 1 has a list of self-tests comprising self-tests A, B, and C, application 2 has a list of self-tests comprising self-tests C, and D.

If application 1 is used first, then the indicator for self-test C indicates that this self-test is optional.

When application 2 is executed, self-test C is considered as optional and may not be performed: only self-test B is performed and the transaction time is reduced.

In an embodiment, if the indicator memorized in the device indicates that said at least one self-test corresponding to the indicator is optional, then after performing said at least one self-test corresponding to the indicator, the indicator is attributed a state which indicates that said at least one self-test corresponding to the indicator is not optional.

This embodiment is particularly advantageous for an application used when entering and exiting a building: once the user enters the building, the can use less-secured applications without having to perform optional self-tests. However, once the user exits the building, the entering and exiting application can attribute the indicator a "not optional" state.

In an embodiment, the indicator is overlooked according to:

a security level of the application, or when the application has been executed for the last time.

It should be noted that the indicator is memorized in the device either in non-volatile memory or in volatile memory. Using volatile memory allows to maintain an indicator having an "optional state" only when the device is powered.

Overlooking the indicator on the basis of when the application has been executed for the last time allows the application to determine that a self-test should be performed only if the last time the application was used was distant (for example further than the day before). In an advantageous embodiment, the application determines that at least one self-test should not be performed is the indicator indicates that the application has been used for the last time previously on the same day.

According to an embodiment, said list of applications comprises at least one personal identity verification application, a payment application, a physical access control application, an identity verification application (personal identity of a user or identification of a device), an electronic signature application, an authentication application, an encryption application, or a decryption application.

According to an embodiment, the electronic device is an electronic device as defined in the ISO/IEC 7816 standard, and/or the ISO/IEC 14443 standard or the ISO/IEC 15693 standard.

A device according to the ISO/IEC 7816 standard and to either the ISO/IEC 14443 standard or the ISO/IEC 15693 standard is a dual interface device.

This electronic device may be equipped with a single-chip microcontroller and it can be a smart-card, an embedded secure element, a USB, a micro secure digital card, a smart phone, a smart watch, or any smart token.

The invention also provides an electronic device capable of communicating with a reader, comprising a processor configured for:

receiving a command emitted by the reader, selecting an application to be executed by the processor of the electronic device on the basis of said command, determining whether to perform at least one self-test according to which application has been selected.

According to an embodiment said application having been selected is configured to determine whether to perform said at least one self-test.

According to an embodiment, said at least one self-test is a self-test of a cryptographic function of the electronic device carried out by the electronic device.

According to an embodiment, said at least one self-test is a power-on self-test as defined in the FIPS 140 standard.

According to an embodiment, the processor is configured for selecting an application among a list of applications of the electronic device, each application being associated with a list of self-tests specific to the application, and the application having been selected is configured for determining whether to perform at least one self-test by selecting at least one self-test to be performed or none in the list of self-tests associated with the application having been selected.

According to an embodiment, the application is configured for determining whether to perform at least one self-test according to whether the electronic device communicates with the reader in contact mode or contactless mode.

According to an embodiment, the application is configured for determining whether to perform at least one self-test is performed according to a plurality of indicators memorized in the electronic device, each indicator corresponding to at least one self-test.

According to an embodiment, each indicator indicates whether the at least one self-test corresponding to the indicator is optional, and if the indicator memorized in the device indicates that said at least one self-test corresponding to the indicator is not optional, then after performing said at least one self-test corresponding to the indicator, the application is configured for attributing to the indicator a state which indicates that said at least one self-test corresponding to the indicator is optional.

According to an embodiment, if the indicator memorized in the device indicates that said at least one self-test corresponding to the indicator is optional, then after performing said at least one self-test corresponding to the indicator, the application is configured for attributing to the indicator a state which indicates that said at least one self-test corresponding to the indicator is not optional.

According to an embodiment, the indicator is overlooked according to:

a security level of the application, or when the application has been executed for the last time.

According to an embodiment, said list of applications comprises at least one personal identity verification application, a payment application, a physical access control application, an identity verification application (personal identity of a user or identification of a device), an electronic signature application, an authentication application, an encryption application, or a decryption application.

According to an embodiment, the electronic device is an electronic device as defined in the ISO 7816/IEC standard, and/or the ISO/IEC 14443 standard or the ISO/IEC 15693 standard.

The invention also provides a computer program comprising instructions for, when the instructions are executed on a processor of an electronic device capable of communicating with reader:

receiving a command emitted by the reader, selecting an application to be executed by the electronic device on the basis of said command, and determining, by said application having been selected, whether to perform at least one self-test.

This program can use any programming language and take the form of source code, object code or a code intermediate between source code and object code, such as a partially compiled form, or any other desirable form.

The invention also provides a recording medium readable by a processor of an electronic device capable of communicating with a reader, on which is recorded instructions for:

receiving a command emitted by the reader, selecting an application to be executed by the electronic device on the basis of said command, and determining, by said application having been selected, whether to perform at least one self-test.

Alternatively, the recording medium can be an integrated circuit in which the program is incorporated, the circuit being adapted to execute the method in question or to be used in its execution.

SHORT DESCRIPTION OF THE DRAWINGS

Other features and advantages of the present invention will become apparent from the description made below, with reference to the appended drawings which illustrate an example thereof without any limitation.

DETAILED DESCRIPTION OF AN EMBODIMENT

A method performed by a smart-card and a smart-card according to the invention will now be described.

The examples of the present detailed description are directed to smart-cards. However, it should be noted that the invention can be applied to other types of electronic devices capable of communicating with a reader and capable of performing self-tests (for example an embedded secure element, a USB token, a micro secure digital card, a smart phone, a smart watch, or any smart token). It should also be noted that the following examples apply to the implementation of a transaction between a smart-card and a reader. The word transaction is directed not only to banking operations (payment or checking a bank account) but also to personal identity verification transaction, transport transactions, and other types of transactions using smart-cards and readers.

Figure 1:
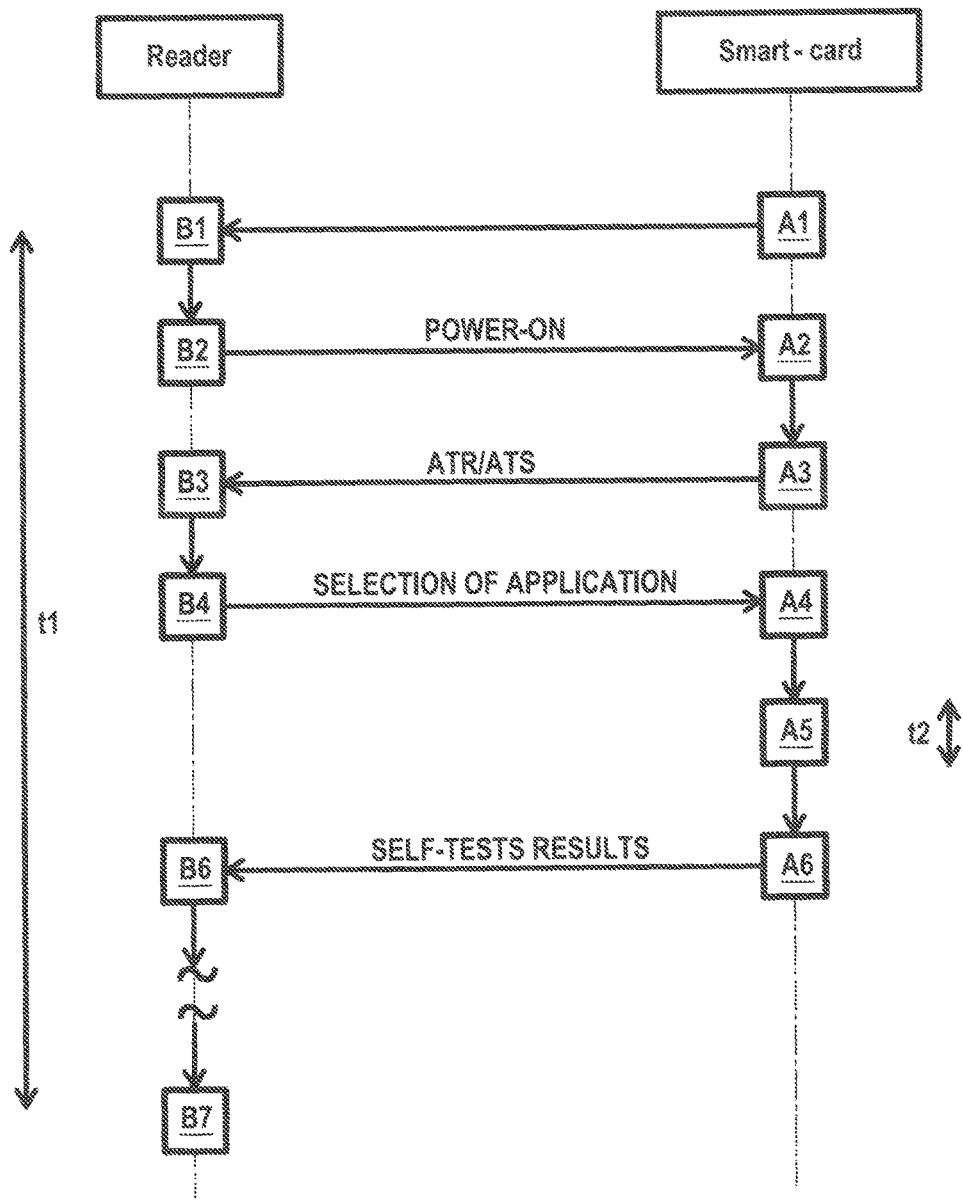
FIG. 1 is a flowchart of an example of method according to the invention.

On FIG. 1, a flowchart of a transaction has been represented. This transaction is carried out by a reader and a smart-card, the smart-card being a smart-card according to the ISO/IEC 7816 standard and the ISO/IEC 14443 standard or the ISO/IEC 15693 standard (i.e. a smart card with dual interfaces).

In a first step A1, a user manipulates the smart-card in order to make it communicate with the reader. This manipulation can consist in inserting the smart-card in the reader if a contact-mode is used or approaching the smart-card to the reader if a contactless-mode is used.

In step B1, the reader detects that the smart-card is present.

The reader can then provide electrical power to the smart-card (step B2).

In step A2, the smart-card receives the electrical power.

In step A3, the smart-card prepares an Answer To Reset (ATR) message or an Answer To Select (ATS) message (depending on whether a contact-mode or a contactless-mode is used).

In step B4, the reader emits a command for selecting the application (for example an APDU command). This message is configured to only be understood by the application which the reader expects to be executed by the smart-card.

In step A4, the application which has been selected and which is executed now determines whether to perform at least one power-up self-test as defined in the FIPS 140 standard. This determination comprises retrieving a list of power-up self-tests associated with the application and performing the tests of this list (the list can be empty), or retrieving this list and selecting which self-tests should be performed according to additional criteria.

In step A5, the power-up self-tests which should be performed as determined in step A4 are performed. As can be seen on the figures, the power-up self-tests are performed without receiving any communication from the reader.

The smart-card then emits a message indicating whether the self-tests have succeeded or not (step A6). This message is received in step B6 by the reader, and the transaction continues until step B7 when the transaction ends.

The total duration of the transaction is denoted on FIG. 1 by the reference t1. The duration of the power-up self-tests performed in step A5 is denoted t2.

If the smart card is used in a transportation context in contactless mode, then it should be noted that t1 should not exceed 200 milliseconds. In order to reach this limit of 200 milliseconds, the transport application can determine that only a limited set of power-up self-tests should be performed, for example in order to have a duration t2 smaller than 150 milliseconds.

It should be noted that this determination can be performed by selecting, in the self-tests defined in the FIPS 140 standard, only the tests linked to functions used by the application: this allows maintaining an acceptable level of security. Such self-tests may include know-answer-tests (KAT) of cryptographic algorithms, tests of random number generators, integrity tests, etc.

If the smart card is used in a document signature context in contact mode, then there are fewer constraints on the duration t1 which can be of the order of 500 milliseconds. The signature application, which requires a high level of security, can determine that more tests should be performed with respect to the previous example. The duration t2 can then reach 500 milliseconds.

Figure 2:
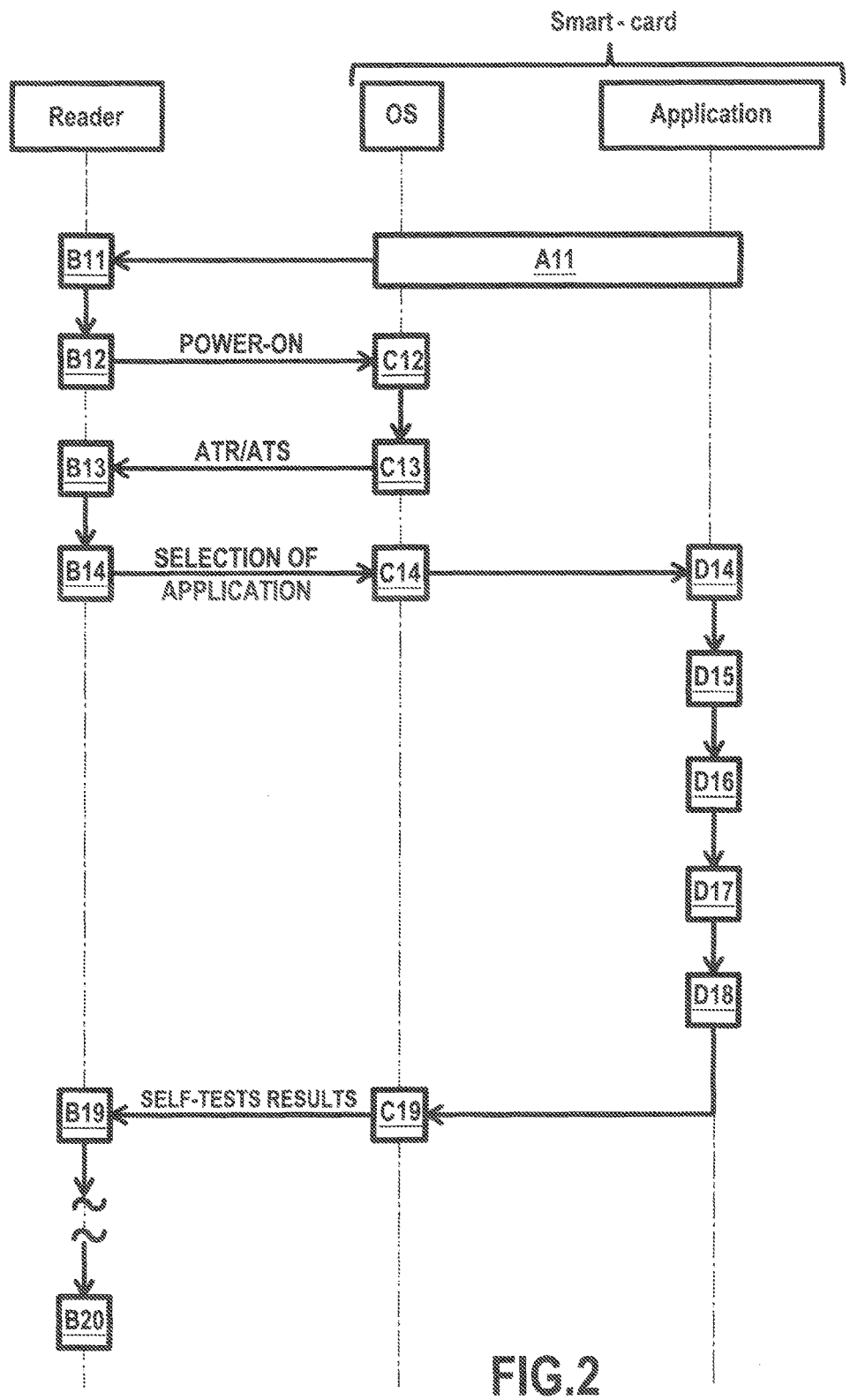
FIG. 2 is a flowchart of another example of method according to the invention.

FIG. 2 is a more detailed example of a transaction carried out between a smart-card and a reader. On this figure, it is detailed which entity of the smart-card performs the steps of the method. More precisely, the smart-card comprises a platform, or operating system (OS hereinafter), for example a Javacard platform. The smart-card further comprises at least one application.

In a first step A11, a user manipulates the smart-card in order to make it communicate with the reader.

In step B11, the reader detects that the smart-card is present.

The reader can then provide electrical power to the smart-card (step B12).

In step C12, the OS receives the electrical power.

In step C13, an ATR or an ATS message is emitted by the smart-card.

In step B13, the ATR or ATS message is received, and in step B14, the reader emits an APDU command for selecting an application.

In step C14, the OS selects an application.

It should be noted that an additional step may have been carried out by the smart-card in which a limited number of power-up self-tests from the FIPS standard are performed under control of the OS. This additional step can be carried out after step C13 but before step C14.

The application is executed in step D14.

In step D15, it is determined whether a contact-mode or a contact-less mode is used, and this information will be used for the determination of the self-tests to be performed.

In step D16, indicators are read in order to determine whether the self-tests in the list of self-tests of the application are individually optional.

The application can then determine (step D17), in its list of power-up self-tests, which power-up self-tests should be performed by taking into account:

Whether a contact-mode or a contact-less mode is used (fewer self-tests should be performed when a contact-less mode is used), The indicators.

It should be noted that steps D15 to D17 can be executed quasi simultaneously.

The application then requests the execution of these tests (step 18), using a cryptographic module.

In step C19, the OS elaborates a message indicating whether the self-tests have succeeded and this message is received by the reader in step B19.

In step B20, the transaction ends.

It should be noted that prior to ending the transaction, the indicator read in step D16 can be updated.

Figure 3:
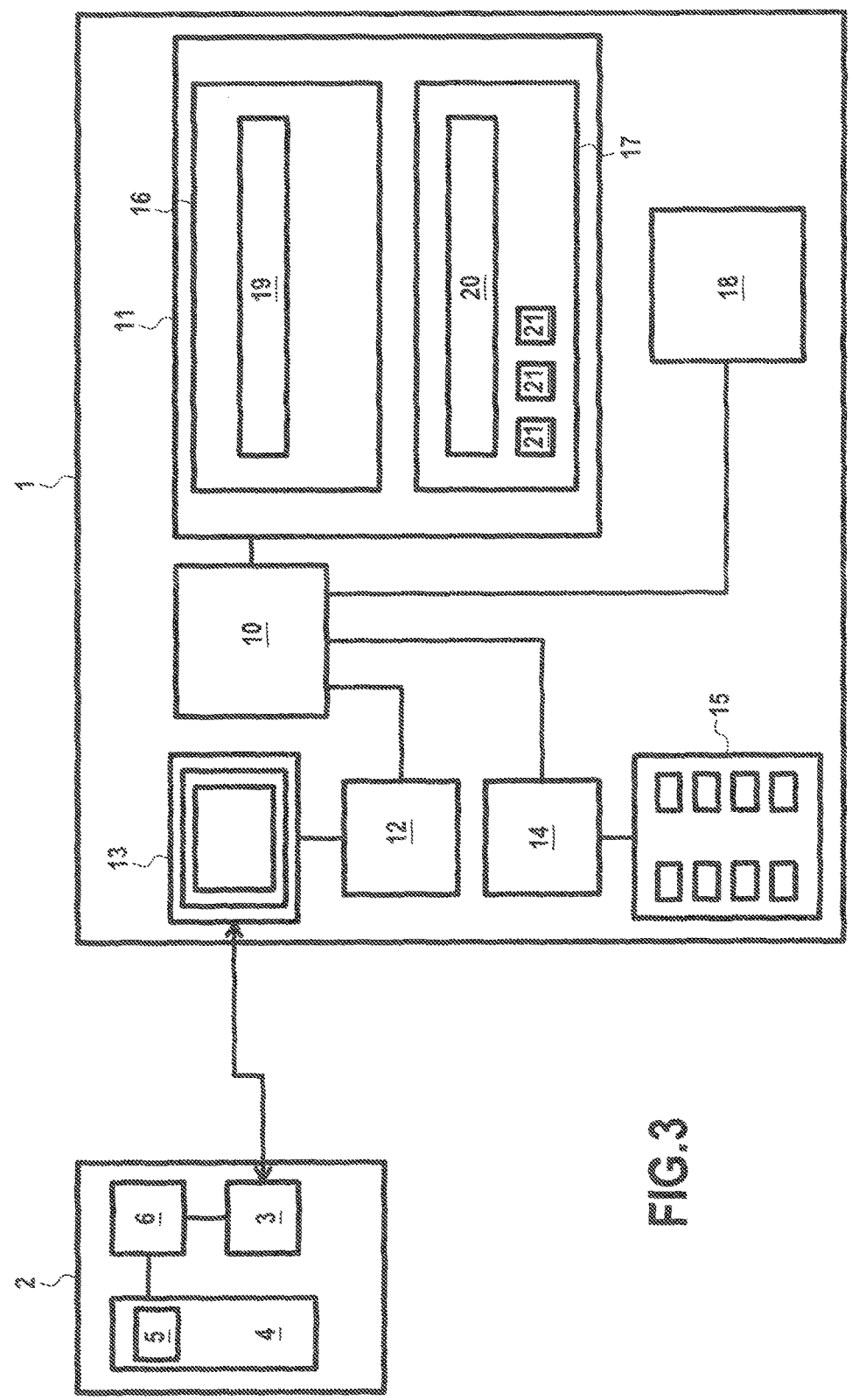
FIG. 3 is a schematic representation of a reader and a smart-card according to an example of the invention.

On FIG. 3 a smart-card 1 (in accordance with the ISO/IEC 7816 standard and the ISO/IEC 14443 standard or the ISO/IEC 15693 standard) according to an embodiment of the invention is shown cooperating with a reader 2.

The smart-card 1 is a device associated with a user comprising personal data. The reader 2 is distinct from the smart-card 1 and the smart-card 1 and the reader are only communicating ephemerally and not permanently.

The reader 2 is a contactless reader having an antenna 3 for communicating with the smart-card 1. The reader is equipped with a memory 4 in which instructions 5 for performing transactions are stored. These instructions are executed by a processor 6 of the reader 2.

The smart-card 1 is also equipped with a processor 10 and a memory 11 (for example Flash memory).

In order to communicate with the reader 2, the smart-card 1 comprises a communicating module 12 and an antenna 13 used for contactless communications. The antenna 13 and the communicating module 12 receive messages from the reader 2.

The smart-card 1 is further equipped with another communicating module 14 and connection pads 15.

The memory 11 comprises a platform or OS 16 and an application 17. Additional applications can be stored in the memory 11 in order to perform various types of transactions. Both the OS 16 and the application 17 can launch the execution of self-tests, and these self-tests are performed by a cryptographic module 18.

The OS 16 comprises an instruction, executable by the processor 10, to select an application to be executed on the basis of messages received from both communicating modules 12 and 14.

When the application 17 is selected, the processor 10 can execute instructions 20 of the application in order to whether to perform at least one self-test. It should be noted that even if it is the processor which executes the instructions, it is considered in the present description that the application carries out this task for the sake of simplicity.

The application 17 also comprises, stored in the memory, indicators 21 which are each associated with a self-test. These indicators 21 indicate whether the self-tests are optional.

What is claimed is:

1. A method performed by an electronic device capable of communicating with a reader, the method comprising:

receiving a command emitted by the reader that powers the electronic device, selecting an application to be executed by the electronic device on the basis of said command, and determining whether to perform at least one self-test according to which application has been selected, wherein said at least one self-test comprises a self-test of a cryptographic function of the electronic device carried out by the electronic device, wherein said selecting an application comprises selecting an application among a list of applications of the electronic device, each application being associated with a list of self-tests specific to the application, and said determining whether to perform at least one self-test comprises selecting at least one self-test to be performed or none in the list of self-tests associated with the application having been selected, wherein the determining is further according to a plurality of indicators memorized in the electronic device, each indicator corresponding to at least one self-test, and wherein each indicator indicates whether the at least one self-test corresponding to the indicator is optional, and if the indicator memorized in the electronic device indicates that said at least one self-test corresponding to the indicator is not optional, then after performing said at least one self-test corresponding to the indicator, the indicator is attributed a state which indicates that said at least one self-test corresponding to the indicator is optional.

2. The method according to claim 1, wherein the application having been selected determines whether to perform said at least one self-test.

3. The method according to claim 1, wherein said at least one self-test is a power-up self-test as defined in the FIPS 140 standard.

4. The method according to claim 1, wherein determining whether to perform at least one self-test is further according to whether the electronic device communicates with the reader in contact mode or contactless mode.

5. The method according to claim 1, wherein if the indicator memorized in the electronic device indicates that said at least one self-test corresponding to the indicator is optional, then after performing said at least one self-test corresponding to the indicator, the indicator is attributed a state which indicates that said at least one self-test corresponding to the indicator is not optional.

6. The method according to claim 1, wherein the indicator is overlooked according to:
a security level of the application, or
when the application has been executed for the last time.

7. The method according to claim 1, wherein said list of applications comprises at least one personal identity verification application, a payment application, a physical access control application, an identity verification application, an electronic signature application, an authentication application, an encryption application, or a decryption application.

8. The method according to claim 1, wherein the electronic device is an electronic device as defined in the ISO 7816/IEC standard, the ISO/IEC 14443 standard or the ISO/IEC 15693 standard.

9. An electronic device capable of communicating with a reader, comprising a processor configured for:
receiving a command emitted by the reader that powers the electronic device,
selecting an application to be executed by the processor of the electronic device on the basis of said command, and
determining whether to perform at least one self-test according to which application has been selected, wherein said at least one self-test comprises a self-test of a cryptographic function of the electronic device carried out by the electronic device,
wherein said selecting an application comprises selecting an application among a list of applications of the electronic device, each application being associated with a list of self-tests specific to the application, and
the application having been selected is configured for determining whether to perform at least one self-test by selecting at least one self-test to be performed or none in the list of self-tests associated with the application having been selected,
wherein the application is configured for determining whether to perform at least one self-test according to a plurality of indicators memorized in the electronic device, each indicator corresponding to at least one self-test, wherein each indicator indicates whether the at least one self-test corresponding to the indicator is optional, and if the indicator memorized in the electronic device indicates that said at least one self-test corresponding to the indicator is not optional, then after performing said at least one self-test corresponding to the indicator, the application is configured for attributing to the indicator a state which indicates that said at least one self-test corresponding to the indicator is optional.

10. The electronic device of claim 9, wherein said application having been selected is configured to determine whether to perform said at least one self-test.

11. The electronic device according to claim 9, wherein said at least one self-test is a power-on self-test as defined in the FIPS 140 standard.

12. The electronic device according to claim 9, wherein the application is configured for determining whether to perform at least one self-test according to whether the electronic device communicates with the reader in contact mode or contactless mode.

13. The method according to claim 9, wherein if the indicator memorized in the electronic device indicates that said at least one self-test corresponding to the indicator is optional, then after performing said at least one self-test corresponding to the indicator, the application is configured for attributing to the indicator a state which indicates that said at least one self-test corresponding to the indicator is not optional.

14. The method according to claim 9, wherein the indicator is overlooked according to:
a security level of the application, or
when the application has been executed for the last time.

15. The electronic device according to claim 9, wherein said list of applications comprises at least one personal identity verification application, a payment application, a physical access control application, an identity verification application, an electronic signature application, an authentication application, an encryption application, or a decryption application.

16. The electronic device according to claim 9, wherein the electronic device is an electronic device as defined in the ISO 7816/IEC standard, the ISO/IEC 14443 standard or the ISO/IEC 15693 standard.

17. A computer readable non-transitory storage medium readable by a processor of an electronic device capable of communicating with a reader, on which is recorded instructions for:
receiving a command emitted by the reader that powers the electronic device,
selecting an application to be executed by the electronic device on the basis of said command, and
determining whether to perform at least one self-test according to which application has been selected, wherein said at least one self-test comprises a self-test of a cryptographic function of the electronic device carried out by the electronic device,
wherein said selecting an application comprises selecting an application among a list of applications of the electronic device, each application being associated with a list of self-tests specific to the application, and
said determining whether to perform at least one self-test comprises selecting at least one self-test to be performed or none in the list of self-tests associated with the application having been selected, wherein the determining is further according to a plurality of indicators memorized in the electronic device, each indicator corresponding to at least one self-test, and wherein each indicator indicates whether the at least one self-test corresponding to the indicator is optional, and if the indicator memorized in the electronic device indicates that said at least one self-test corresponding to the indicator is not optional, then after performing said at least one self-test corresponding to the indicator, the indicator is attributed a state which indicates that said at least one self-test corresponding to the indicator is optional.

18. A method performed by an electronic device capable of communicating with a reader, the method comprising:

receiving a command emitted by the reader that powers the electronic device, selecting an application to be executed by the electronic device on the basis of said command, determining whether to perform at least one self-test according to which application has been selected, wherein said at least one self-test comprises a self-test of a cryptographic function of the electronic device carried out by the electronic device, and executing the application without performing the at least one self-test based on the determining, wherein said selecting an application comprises selecting an application among a list of applications of the electronic device, each application being associated with a list of self-tests specific to the application, and said determining whether to perform at least one self-test comprises selecting at least one self-test to be performed or none in the list of self-tests associated with the application having been selected, wherein the determining is further according to a plurality of indicators memorized in the electronic device, each indicator corresponding to at least one self-test, and wherein each indicator indicates whether the at least one self-test corresponding to the indicator is optional, and if the indicator memorized in the electronic device indicates that said at least one self-test corresponding to the indicator is not optional, then after performing said at least one self-test corresponding to the indicator, the indicator is attributed a state which indicates that said at least one self-test corresponding to the indicator is optional.

* * * * *